Aug. 22, 1961 R. L. SITTEL ET AL 2,997,315
PIVOTAL TRAILER UNIT
Filed May 9, 1960 2 Sheets-Sheet 2

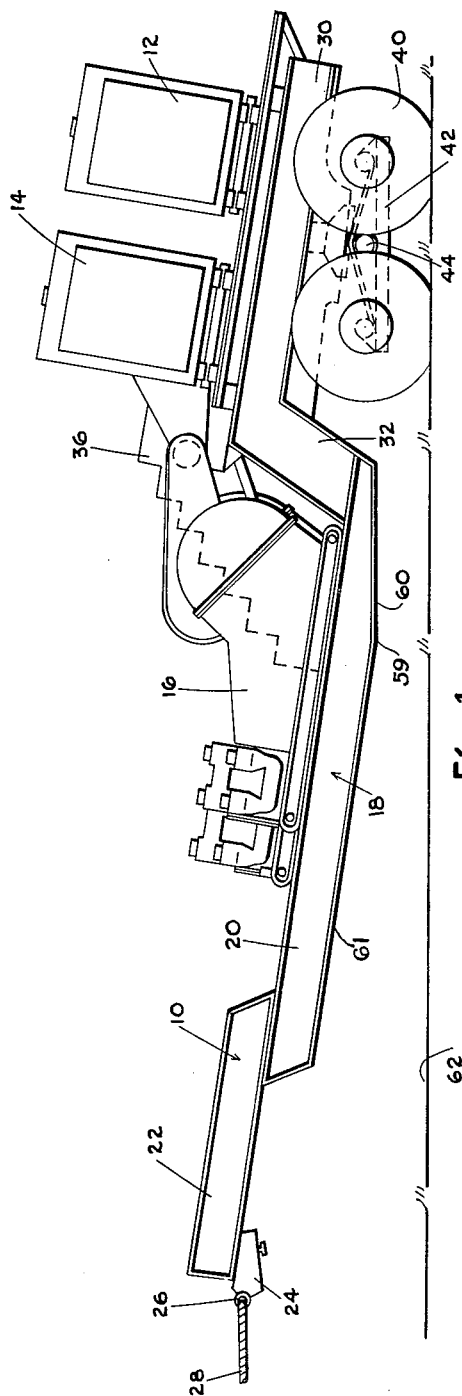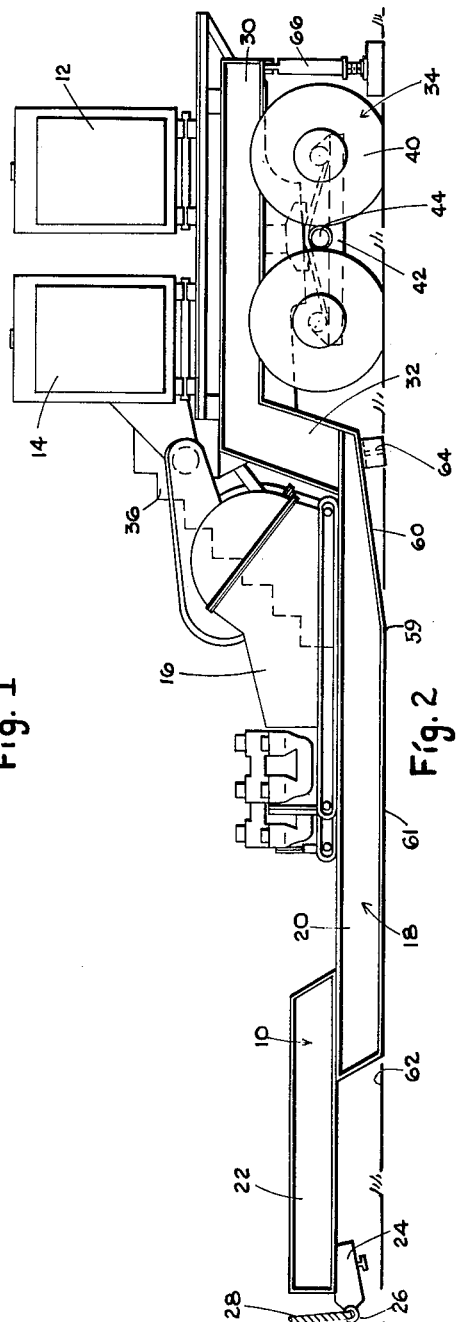

INVENTORS.
RICHARD L. SITTEL
TRUETT M. CONE
AMBROSE S. RINGWALD
SOLON D. YOUNG

BY C. M. McKnight

United States Patent Office 2,997,315
Patented Aug. 22, 1961

2,997,315
PIVOTAL TRAILER UNIT
Richard L. Sittel, Tulsa, Okla., Truett M. Cone, Fort Worth, Tex., Ambrose S. Ringwald, New York, N.Y., and Solon D. Young, Midland, Tex., assignors to Unit Rig & Equipment Company, Tulsa, Okla., a corporation of Delaware
Filed May 9, 1960, Ser. No. 27,609
6 Claims. (Cl. 280—423)

This invention relates to improvements in truck mounted equipment, and more particularly, but not by way of limitation, to a tractor or truck trailer unit particularly designed and constructed for facilitating the portability of heavy equipment mounted thereon.

Heavy equipment, such as pumps, engines, compressors, draw works, and the like, are normally utilized during the drilling of a well bore. However, since most of this heavy equipment is not required during the production of fluid from the well upon completion of the drilling operation, the equipment is frequently mounted on a trailer unit. In this manner, the apparatus may be transported from the completed well site to a second location wherein the equipment may be needed. Compressors, engines, pumps, and other types of heavy apparatus usually create considerable vibration during the operation thereof and thus require a substantial and stable base or foundation for the support thereof. In addition, it is desirable to locate the pumping equipment, and particularly suction type pumps, as close to the surface of the ground as possible, since the slush pit or sump at the well site is usually an excavation in the ground, and the least or minimum distance through which the mud or fluid must be elevated by the pump is desirable for a more efficient operation thereof. Thus, it is preferable to position the trailer mounted equipment as close to the ground level as possible without the necessity of removal thereof from the mounted position on the trailer unit to provide for stabilization thereof, as well as for an increased operating efficiency. This presents a problem in the industry in that the trailer unit must also be sufficiently elevated from the ground to provide for road clearance during the transporting of the equipment from one location to another.

The present invention contemplates a novel trailer unit adapted to be towed by a tractor, or the like, for supporting heavy equipment in such a manner that the equipment may be disposed substantially at the ground level during the operation thereof, and yet may be elevated to provide for road clearance of the trailer during the transporting of the equipment. The novel trailer comprises a body portion pivotally secured to a wheel unit or running gear apparatus whereby the forward portion of the trailer frame may be elevated for connection with the fifth wheel of the towing tractor during transporting of the equipment. The pivotal frame may be disconnected from the tractor and lowered to a position resting on the ground during the utilization of the equipment, thus substantially eliminating the load on the tires of the wheel unit and providing a stable base or foundation for the operation thereof. The rear portion of the trailer frame is pivotally carried by the running gear unit and is disposed at a slight angle with respect to the horizontal in the lowered position in order that the angle thereof in the raised position will be a minimum, thus providing a minimum angled position for the equipment during the movement of the trailer along a highway, or across the terrain of the countryside. The novel trailer provides the two-fold function of facilitating the portability of heavy equipment and simultaneously assures a sufficiently stable foundation or base therefor during the operation thereof. The novel trailer unit is simple and efficient in operation and economical and durable in construction.

It is, therefore, an important object of this invention to provide a novel trailer unit for transporting heavy equipment mounted thereon from one location to another with a minimum of effort.

Another object of this invention is to provide a novel trailer unit particularly designed and constructed for positioning the equipment mounted thereon substantially at ground level during the operation thereof for increasing the operating efficiency.

It is another object of this invention to provide a pivotal trailer unit wherein the forward portion of the frame may be readily elevated to provide road clearance for the unit during transporting of the equipment.

A further object of this invention is to provide a novel pivotal trailer unit wherein the frame thereof may be quickly pivoted with respect to the running gear apparatus for facilitating the portability of the equipment mounted thereon.

A still further object of this invention is to provide a novel pivotal trailer unit which is simple and efficient in operation and economical and durable in construction.

Other objects and advantages of the invention will be evident from the following detailed description, read in conjunction with the accompanying drawings, which illustrate my invention.

In the drawings:

FIGURE 1 is a side elevational view of a trailer unit embodying the invention with the frame portion in an elevated postion for transporting thereof.

FIGURE 2 is a side elevational view of a trailer unit embodying the invention with the frame portion in a lowered position for operation of the equipment mounted thereon.

Figure 3:
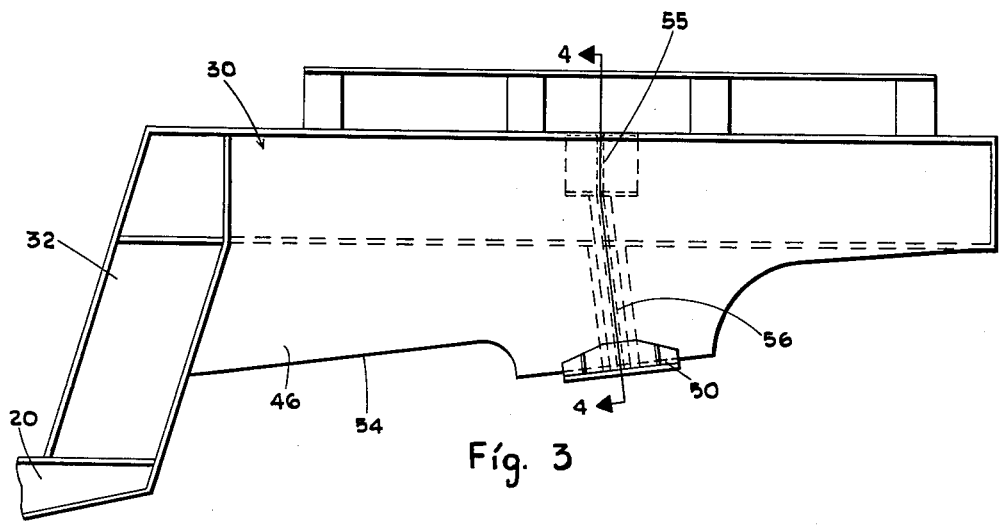
FIGURE 3 is a broken side elevational view of the rear portion of the trailer frame.
Figure 4:
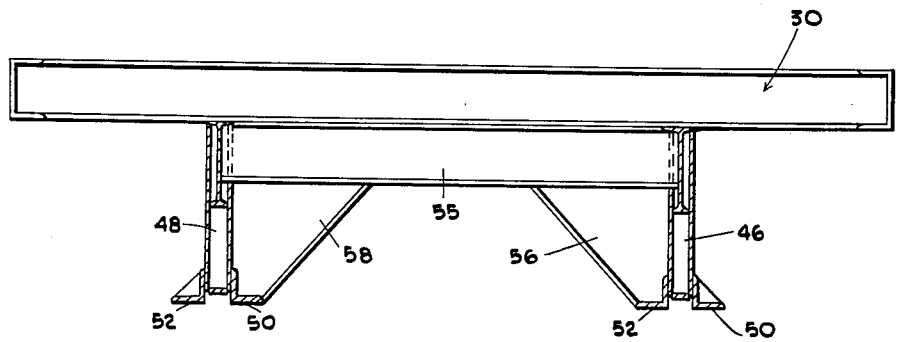
FIGURE 4 is a sectional elevational view taken on line 4—4 of FIG. 3.

Referring to the drawings in detail, reference character 10 generally indicates a trailer unit having suitable heavy apparatus or equipment mounted thereon, such as a pair of engines 12 and 14, for operation of a pair of pumping units 16, only one of which is shown, and as is well known. The trailer unit 10 comprises a frame or chassis 18 preferably constructed from suitable longitudinally extending structural steel beams having cross members (not shown) extending therebetween and is provided with a suitable floor plate (not shown) on the upper surfaces thereof, as is well known. The frame 18 is provided with a central load carrier portion 20 rigidly secured to a front frame portion 22. The front portion 22 is preferably on a plane substantially parallel with the plane of the load carrier portion 20 and is slightly elevated with respect thereto, as clearly shown in FIGS. 1 and 2. The front frame portion 22 is provided with a suitable fifth wheel adaptor member 24 at the forward end thereof for connection with the usual fifth wheel (not shown) of the towing tractor (not shown) in any well known manner (not shown). A transversely extending pipe or rod member 26 is welded or otherwise secured to the forward end of the adaptor 24 for receiving a cable or line 28, which may be anchored thereto in any suitable manner, and which in turn is secured to the usual truck winch (not shown) normally provided on the towing tractor. The cable 28 may be reeled in or let out by the operation of the winch in the well known manner for a purpose as will be hereinafter set forth.

The central portion or load carrier portion 20 is rigidly secured with a rear frame portion 30 by an angularly disposed frame portion 32. The frame portion 32 may extend transversely across the entire trailer frame 18 or may comprise two spaced angularly disposed portions (not shown) whereby the central portion of the frame 18 in the proximity thereof will be open to provide clearance for the pumping equipment 16, or the like, if desired. The rear portion 30 is substantially elevated with respect to the front portion 22 and central portion 20 to provide clearance for a running gear or wheel unit 34, and is secured to the running gear 34 in a manner as will be hereinafter set forth. A centrally disposed stairway 36 may be provided between the load carrier portion 20 and the elevated rear portion 30 in order to facilitate access therebetween by the operators of the equipment.

The running gear 34 depicted herein is preferably an eight wheel type unit, as clearly shown in FIG. 5 to be hereinafter set forth, but it is to be understood that any suitable type of running gear may be utilized with the trailer unit 10, such as a four wheel bogey unit, or the like. However, it has been found under actual working conditions that each of the wheels of an eight wheel running gear will carry essentially the same load during movement of the trailer unit, particularly as the unit travels over rough terrain, thus increasing the overall efficiency of the unit 10. In addition, a walking beam structure, which is well known, for interconnecting the respective wheels is preferable in that the pivotal movement of the trailer frame 18, as will be hereinafter set forth, can be of a much greater degree than is possible with the use of a spring hung axle. However, a spring hung type of axle arrangement may be utilized without departing from the spirit of the invention, and it is only a matter of degree that suggests the preference of a walking beam construction.

Figure 5:
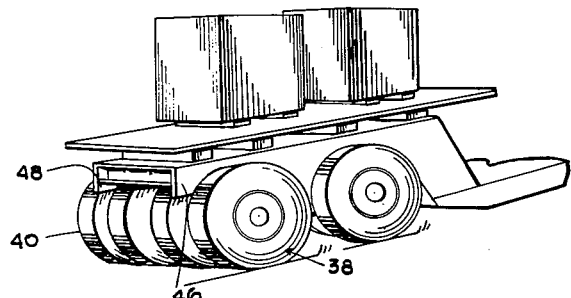
FIGURE 5 is a perspective view in a reduced scale of the rear portion of the trailer unit.

As shown in FIG. 5, the running gear 34 is provided with a four wheel unit 38 transversely spaced from a second four wheel unit 40, thus comprising the eight wheel unit. The wheel unit 38 is completely independent from the wheel unit 40, and the only connection therebetween resides in the structure of the trailer frame 18 and particularly the rear portion 30 thereof, which spans the distance therebetween. Each of the wheel units 38 and 40 is provided with a suitable walking beam apparatus 42 for securing the four wheels thereof to a common axle 44, as is well known. The axle 44 of each wheel unit 38 and 40 receives the frame 18 in a manner to be hereinafter set forth, thus interconnecting the independent wheel units for an efficient operation of the trailer unit 10. The wheel units 38 and 40, by virtue of the independent operation thereof, greatly reduce the bouncing movement or jostling of the frame during the transporting thereof, therefore providing a smoother movement for the equipment mounted thereon.

The rear portion 30 of the frame 18 is provided with a pair of substantially identical downwardly extending spaced chassis members 46 and 48 adapted for disposition adjacent the axle 44 of the wheel units 38 and 40, respectively, thus interconnecting the wheel units. Each of the chassis 46 and 48 is provided with substantially centrally disposed opposed angle members or brackets 50 and 52 for receiving the respective axle 44 therebetween. The brackets 50 and 52 and the chassis 46 and 48 are secured to the axles 44 in any suitable manner (not shown) whereby the chassis members 46 and 48 are pivotal with the axles in a plane perpendicular to the axes thereof. The pivotal action of the chassis members 46 and 48 results from the connection of the axle 44 with the walking beam 42 as clearly shown in FIGS. 1 and 2. The axle 44 is rigidly secured between the walking beams 42 of the spaced running gear members 34 and 38, and the rocking motion of the walking beams, as is well known, provides for the pivotal movement of the axle. The angle members 50 and 52 and the lower edge 54 of each of the chassis members 46 and 48 are disposed at a slightly downwardly extending angle in the forward direction whereby the disposition of the rear portion 30 of the frame 18 will be only slightly angular with respect to the horizontal in either the lowered or raised position of the unit 10, as will be hereinafter set forth. The angular disposition of the rear frame portion 30 as depicted in FIG. 1 is exaggerated for purposes of illustration.

A centrally disposed cross beam 55 extends between the downwardly extending chassis members 46 and 48 to provide rigidity therefor. Suitable strengthening gussets or plates 56 and 58 are welded, or the like, between the beam 55 and the chassis members 46 and 48, respectively. It will be apparent that the beam 55 and gussets 56 and 58 are so disposed to provide sufficient clearance for the wheels of each of the wheel units 38 and 40 to assure that there will be no interference therebetween during the operation of the trailer unit 10.

*Operation*

When it is desired to transport trailer mounted equipment, such as the engines 12 and 14 and the pumping units 16, the trailer unit 10 is secured to a suitable towing tractor (not shown). The cable 28 is secured to the tractor which (not shown) in the usual manner whereby the cable may be reeled in, or pulled in a forward direction as viewed in FIGS. 1 and 2. It will be apparent that the cable 28 may be the winch cable provided with the tractor winch, or may be a separate cable provided with the trailer unit 10, as desired. The forward pull on the cable is transmitted to the frame 18 through the pipe or rod 26, and a continued reeling in of the cable will elevate the forward end or front frame portion 22 for facilitating the disposition thereof on the tractor. The fifth wheel adaptor 24 may be connected or secured to the fifth wheel (not shown) of the tractor in any well known manner (not shown) thus securing the trailer unit 10 to the tractor for transporting of the equipment.

The rear frame portion 30 will pivot with the axles 44 as the front portion 22 is elevated for disposition on the tractor, thus disposing the frame 18 at an angle with respect to the horizontal, as clearly shown in FIG. 1. It is to be noted that the load carrier portion 20 of the frame is provided with an angled portion 60 at the lower rear portion thereof for assuring sufficient road clearance for the frame 18 as the trailer unit 10 is moved along a highway or across the terrain of the countryside. As hereinbefore set forth, the rear portion 30 will be only slightly angularly disposed with respect to the horizontal in the elevated position of the front portion 22, and the angular disposition thereof depicted in FIG. 1 is exaggerated for purposes of illustration. In this position, the trailer unit 10 and the equipment mounted thereon may be readily moved or transported as desired.

When the trailer unit 10 has reached a new or different location wherein the equipment thereon is to be utilized, the frame 18 may be lowered in order that the load carrier portion 20 thereof will be disposed on the ground surface 62 as shown in FIG. 2. The fifth wheel adaptor 24 may be disconnected or removed from the fifth wheel in the usual manner, and the cable 28 may be let out with a simultaneous forward movement of the towing tractor whereby the rear portion 30 will pivot with the axles 44 in order that the frame 18 may be disposed in a substantially horizontal position adjacent the ground surface 62. It will be apparent from FIGS. 1 and 2 that upon the lowering of the frame 18, the juncture point 59 between the angular portion 60 and the flat under portion 61 of the load carrier section 20 will actually contact the ground 62 first, or prior to contact of the flat portion 61. At the point of first contact with the ground, the juncture 59 will become the fulcrum point, and the lowering action will be similar to a teeter totter action. The frame 18, and the distribution of the load thereon, is so arranged that the preponderance of weight is forward of the fulcrum point 59 and the front end of the frame 18 will thus tend to drop to the ground and the weight of the trailer 10 will rest on the ground, thereby relieving the weight or load on the running gear. This elimination of load on the running gear is due to the fact that the summation of moments in a counter-clockwise direction, as viewed in the drawings, about the fulcrum point is greater than the summation of moments in a clockwise direction, and the frame tends to rotate in a counter-clockwise direction. This causes the rear portion of the frame to tend to raise, and reduces or eliminates the load on the running gear. It has been found preferable to provide suitable support blocks 64, only one of which is shown, between the ground surface 62 and the angular portion 60 of the load carrier portion 20 to preclude any accidental rearward movement of the trailer unit 10 in the horizontal disposition thereof. In addition, suitable jack members 66 may be disposed between the ground surface 62 and the rear frame portion 30 for support thereof when the equipment mounted on the trailer is in operation. The jacks 66 may be either separate units, or may be secured to the frame portion 30 in any suitable manner (not shown) for assuring no accidental loss thereof.

With the trailer unit 10 in the lowered or horizontal position depicted in FIG. 2, the engines 12 and 14 and pumping units 16 may be utilized with efficiency. The load carrier portion 20 is disposed on the ground, thus substantially eliminating the load on the tires of the wheel units and assuring a substantial and stable foundation for the equipment during the operation thereof. In addition, the pumps will be disposed substantially at the ground level for increasing the operating efficiency thereof. When it is desired to relocate the equipment, the blocks 64 and jacks 66 may be removed, and the frame 18 may be elevated to the angular position, as hereinbefore set forth, for connection with the tractor, thus facilitating the portability of the heavy equipment.

From the foregoing, it will be apparent that the present invention provides a novel trailer unit adapted for transporting heavy equipment mounted thereon. The novel trailer unit may be readily elevated to an angular disposition for connection with the tractor and to assure sufficient road clearance during the movement thereof along a highway, or the like. The novel trailer unit may be easily lowered to a substantially horizontal position adjacent the ground to provide a stable foundation for the operation of the equipment thereon, as well as to provide an efficient disposition of any pumping equipment which may be provided thereon. The trailer unit is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

In the claims:

1. In a trailer unit, a running gear, a unitary frame comprising a rear portion pivotally secured to the running gear, a load carrier portion rigidly secured to the rear portion and at a lower elevation with respect thereto, a front frame portion elevated with respect to the load carrier portion and adapted to be alternately lowered and raised for pivoting the unitary frame about the running gear and adapted to contact the ground in a horizontal position thereof, said rear portion having the lower edge thereof disposed at an angle with respect to the horizontal position in the lowered position of the frame whereby the angular disposition of the rear portion will be lessened in the raised position of the frame.

2. In a trailer unit, a running gear, a unitary frame pivotally carried by the running gear to provide alternate angular and substantially horizontal positions for the frame, said frame comprising a central load carrier portion adapted for disposition on the ground in the horizontal position of the frame, a rear portion rigidly secured to the load carrier portion and elevated with respect thereto for clearance of the running gear, chassis means provided on the rear portion for securing thereof to the running gear, said chassis means disposed at a slightly forwardly and downwardly angle with respect to the horizontal in the horizontal position of the frame whereby the upward angle of the rear portion will be at a minimum in the angular position of the frame, and a front portion rigidly secured to the load carrier portion adapted to be alternately raised and lowered to provide the angular and horizontal positions for the frame.

3. In a trailer unit, a running gear, a unitary frame pivotally carried by the running gear to provide alternate angular and substantially horizontal positions for the frame, said frame comprising a central load carrier portion adapted for disposition on the ground in the horizontal position of the frame, said disposition on the ground for the central load carrier portion substantially eliminating the load on the running gear, a rear portion rigidly secured to the load carrier portion and elevated with respect thereto for clearance of the running gear, chassis means provided on the rear portion for securing thereof to the running gear, said chassis means disposed at a slightly forwardly and downwardly angle with respect to the horizontal in the horizontal position of the frame whereby the upward angle of the rear portion will be at a minimum in the angular position of the frame, and a front portion rigidly secured to the load carrier portion adapted to be alternately raised and lowered to provide the angular and horizontal positions for the frame.

4. In a transportation trailer unit having coupling means at the forward end, and a running gear at the rear end, a unitary frame pivotally carried by the running gear to provide alternate angular and substantially horizontal positions for the frame, said frame comprising a central load carrier portion adapted in a transport pivoted position to be disposed at an angle relative to the ground, and in an alternate horizontal position disposed below the plane of the wheel axis of the running gear and in contact with the ground for substantially eliminating the load on the running gear.

5. In a trailer unit having coupling means at the forward end, and a running gear at the rear end, a unitary frame portion pivotally carried by the running gear to provide alternate raised and lowered positions of the frame, said frame provided with a load carrier portion, said load carrier portion comprising an elongated body portion having a substantially flat bottom surface, and an end portion therefor disposed at an angle to the body portion providing a fulcrum at the juncture of the said respective portions, said fulcrum providing a rocking movement of the load carrier portion during pivoting thereof from an angled position of the flat surface relative to the ground to a horizontal position contacting the ground for substantially eliminating the load on the running gear.

6. In a trailer unit having coupling means at the forward end, and a running gear at the rear end, a unitary frame portion pivotally carried by the running gear to provide alternate raised and lowered positions of the frame, said frame provided with a load carrier portion, said load carrier portion comprising an elongated body portion having a substantially flat bottom surface, and a rear end portion therefor disposed at an angle to the body portion providing a fulcrum at the juncture of the said respective portions, said fulcrum providing a rocking movement of the load carrier portion during pivoting thereof from an angled position of the flat surface relative to the ground to a horizontal position contacting the ground for substantially eliminating the load on the running gear.

References Cited in the file of this patent

UNITED STATES PATENTS

| | | |
|---|---|---|
| 2,415,706 | Ronk | Feb. 11, 1947 |
| 2,579,003 | Josephian | Dec. 18, 1951 |
| 2,709,087 | Jenkins et al. | May 24, 1955 |
| 2,759,737 | Manning | Aug. 21, 1956 |
| 2,878,033 | Polich | Mar. 17, 1959 |
| 2,894,764 | Ronk | July 14, 1959 |
| 2,904,340 | Simpson | Sept. 15, 1959 |
| 2,960,123 | O'Quinn | Nov. 15, 1960 |